Feb. 2, 1971               J. G. BENTLEY                3,559,350
                          PLANE ATTACHMENTS
Filed May 3, 1967                                    11 Sheets-Sheet 1

FIG. 1

INVENTOR
JOHN GORDON BENTLEY
BY
Strauch, Nolan, Neale,
Nies & Kurz
        ATTORNEYS Feb. 2, 1971  J. G. BENTLEY  3,559,350
PLANE ATTACHMENTS
Filed May 3, 1967  11 Sheets-Sheet 2
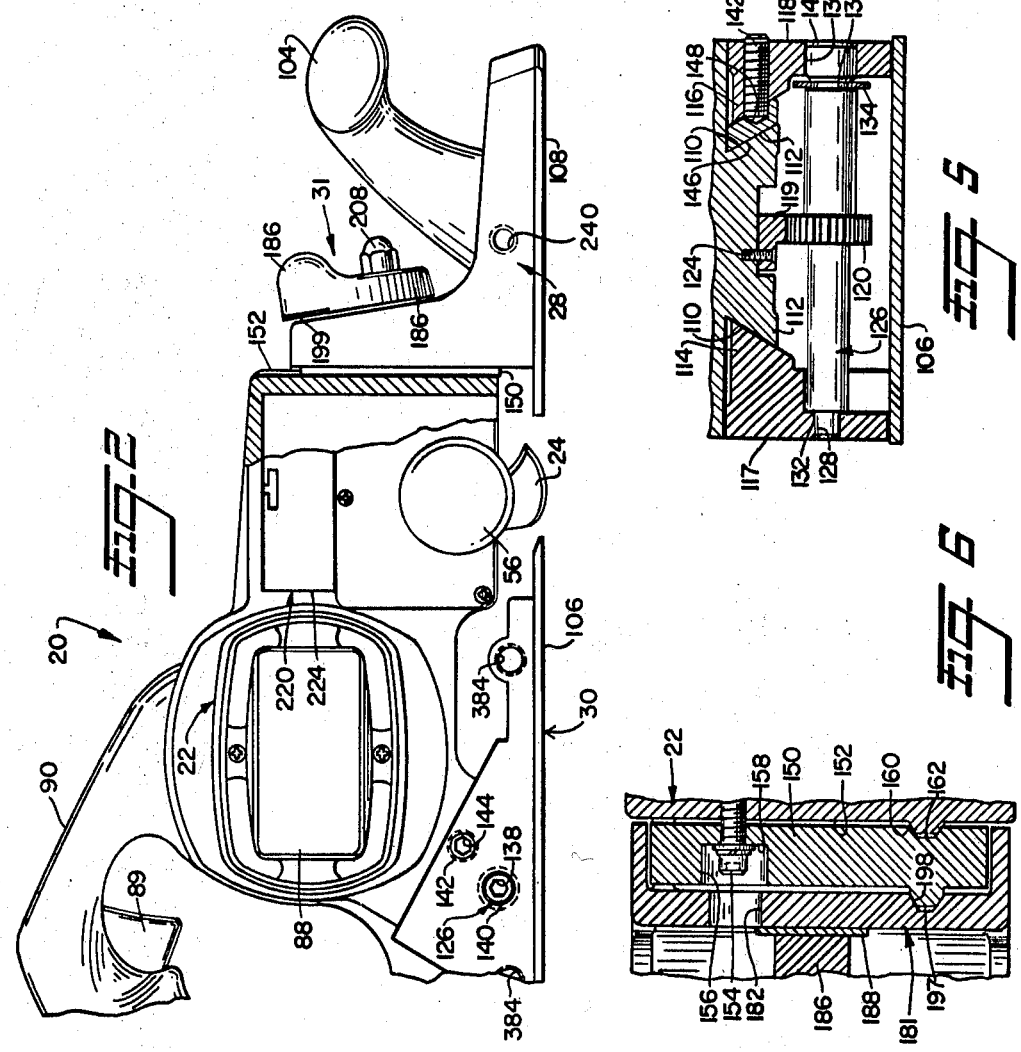
INVENTOR
JOHN GORDON BENTLEY
BY *Strauch, Nolan, Neale, Nies & Kurz*
ATTORNEYS

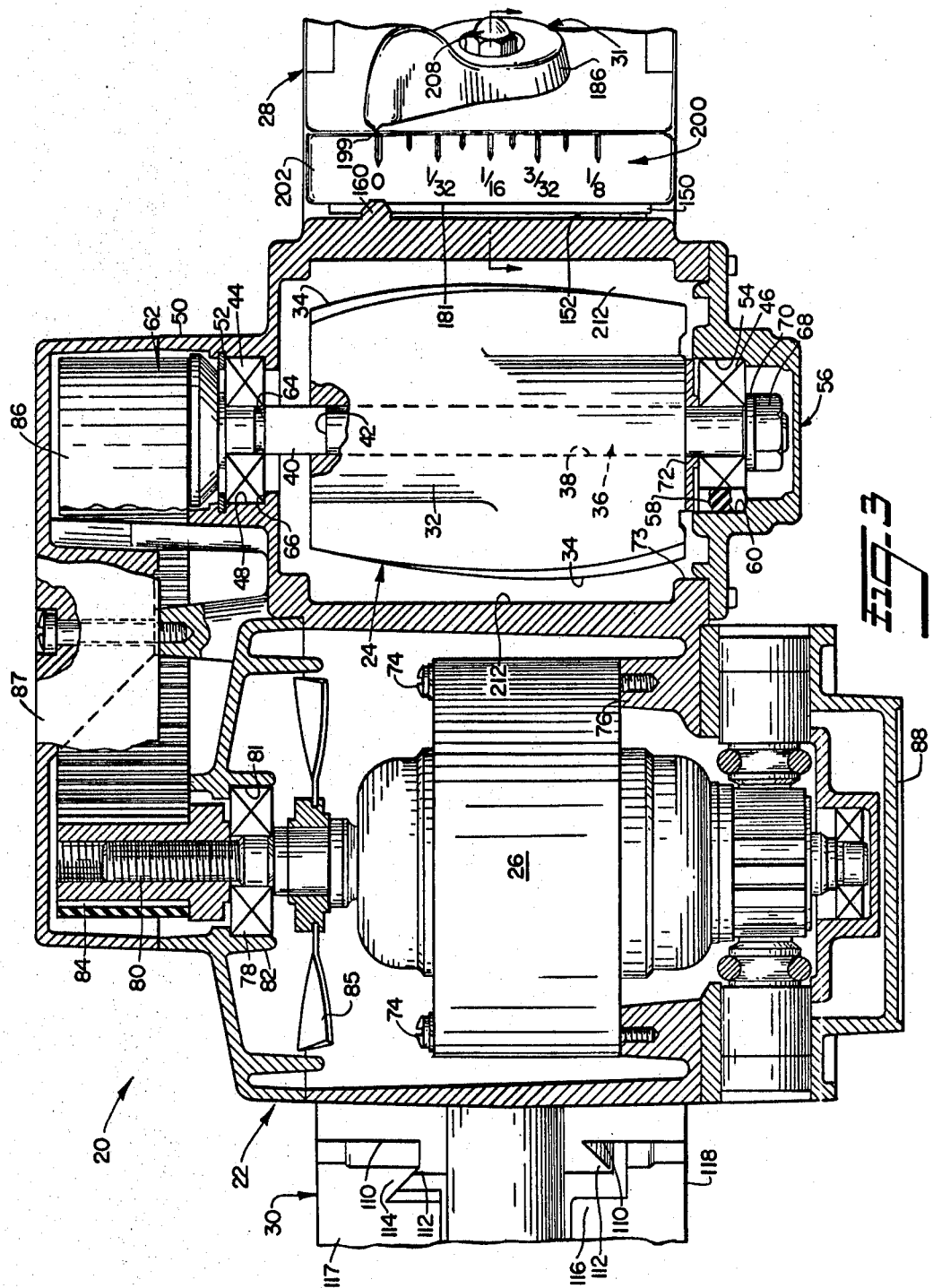

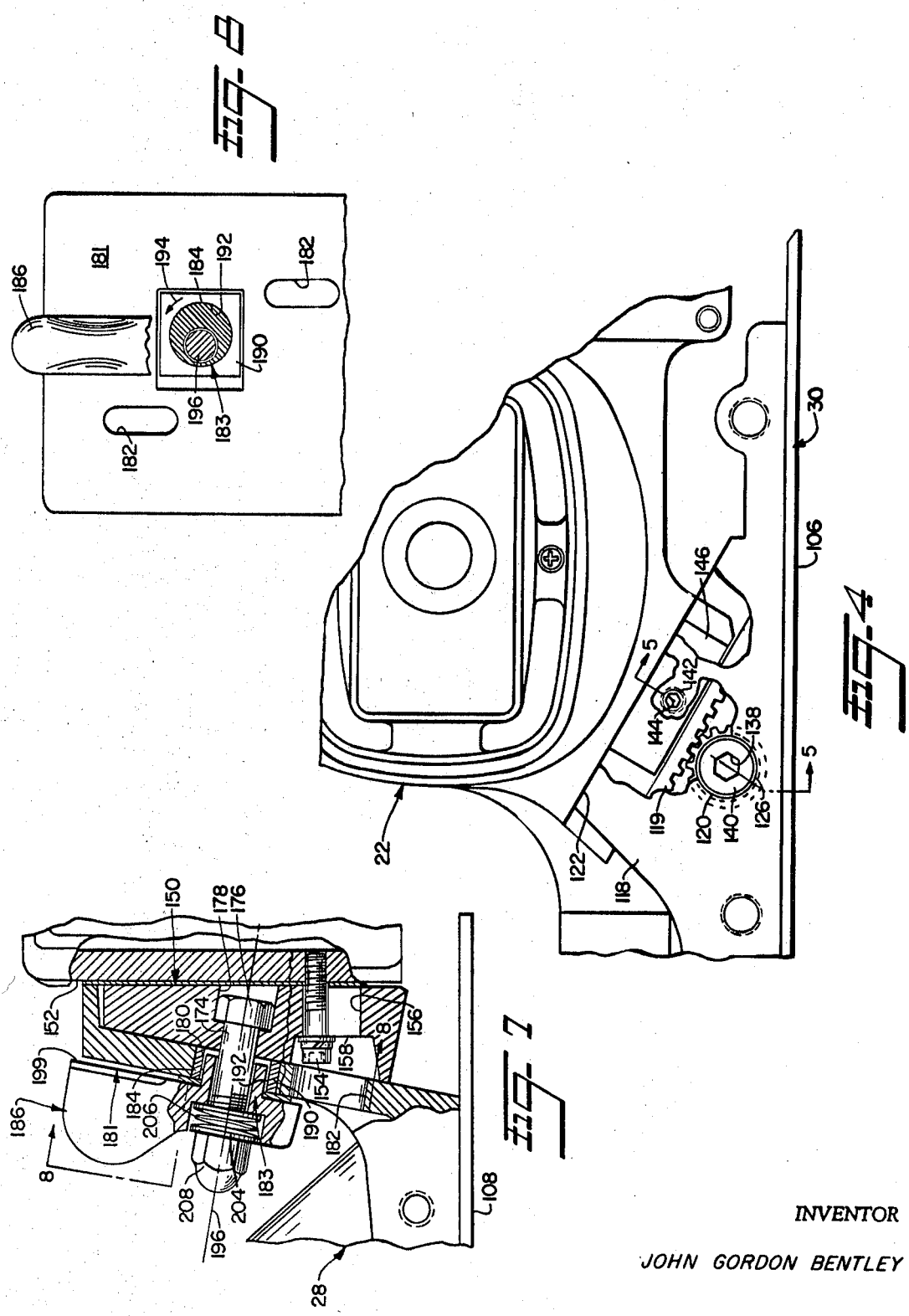

Feb. 2, 1971 J. G. BENTLEY 3,559,350
PLANE ATTACHMENTS
Filed May 3, 1967 11 Sheets-Sheet 5

INVENTOR
JOHN GORDON BENTLEY
BY
Strauch, Nolan, Neale,
Nies & Kurz
ATTORNEYS

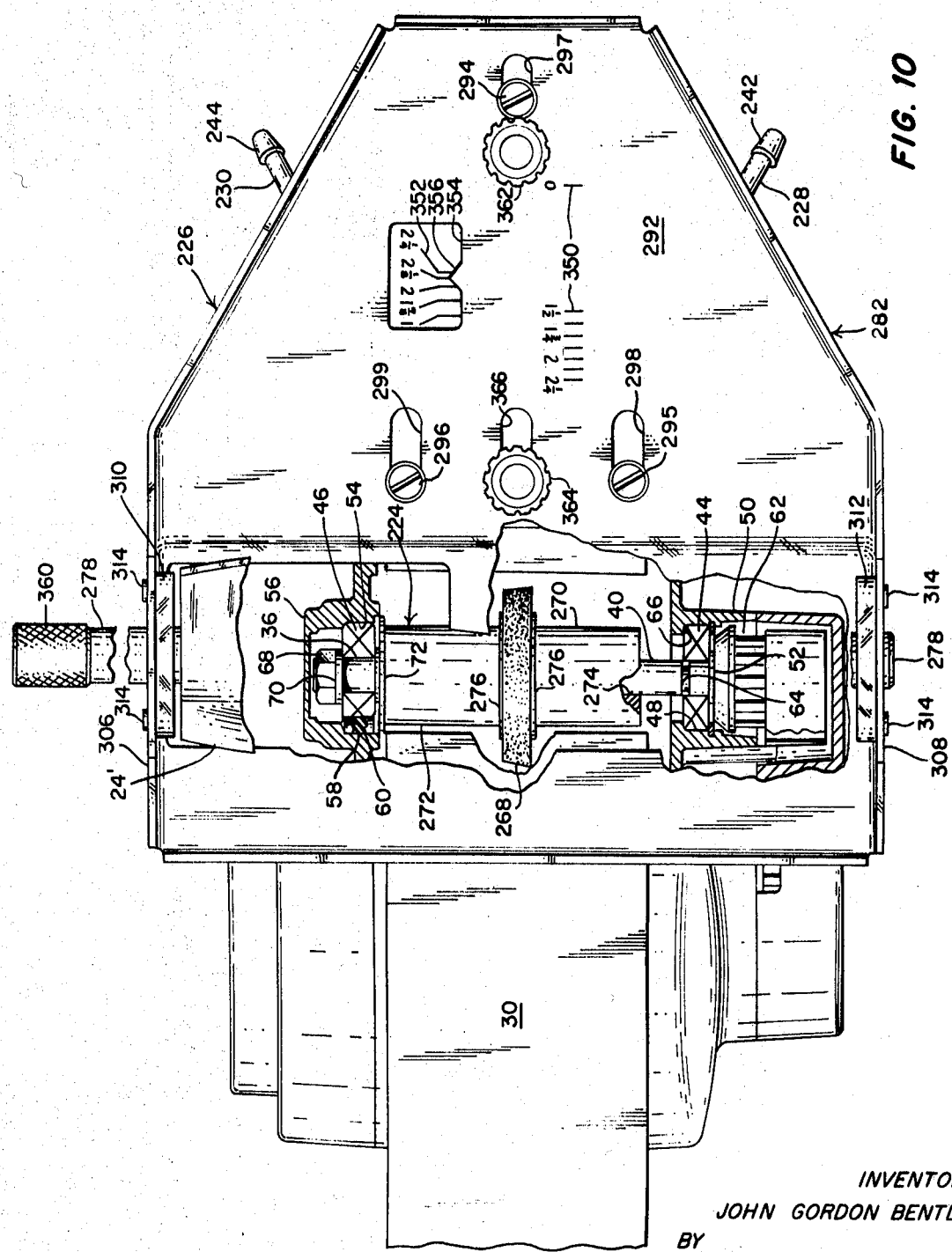

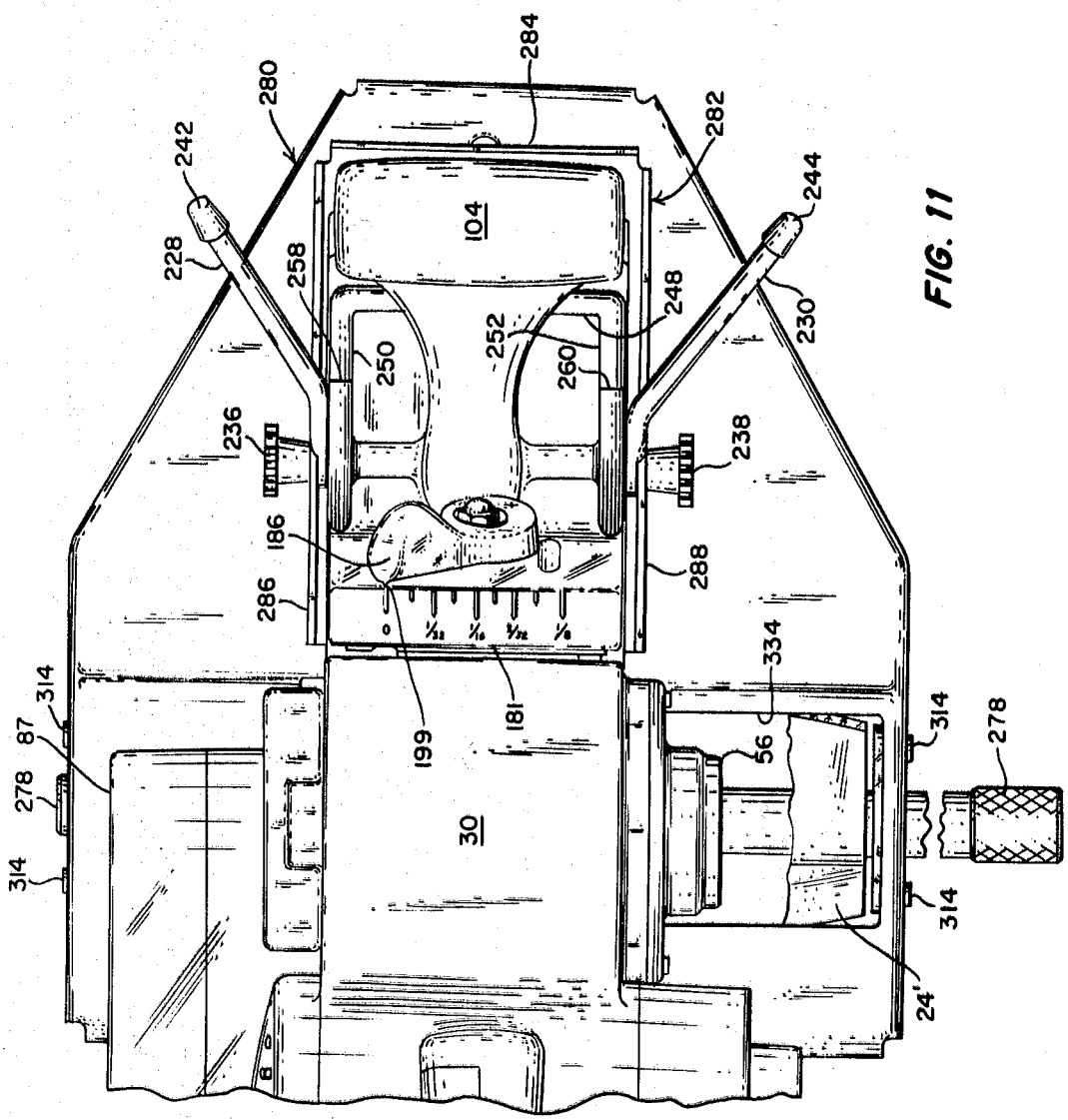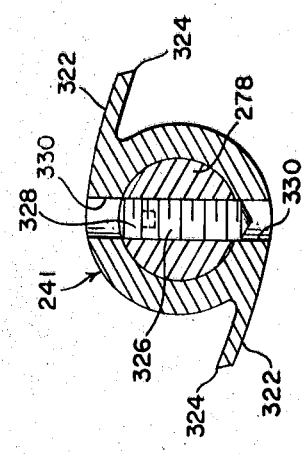

Feb. 2, 1971  J. G. BENTLEY  3,559,350
PLANE ATTACHMENTS

Filed May 3, 1967  11 Sheets-Sheet 9

INVENTOR
JOHN GORDON BENTLEY
BY
Strauch, Nolan, Neale,
Nies & Kurz
ATTORNEYS

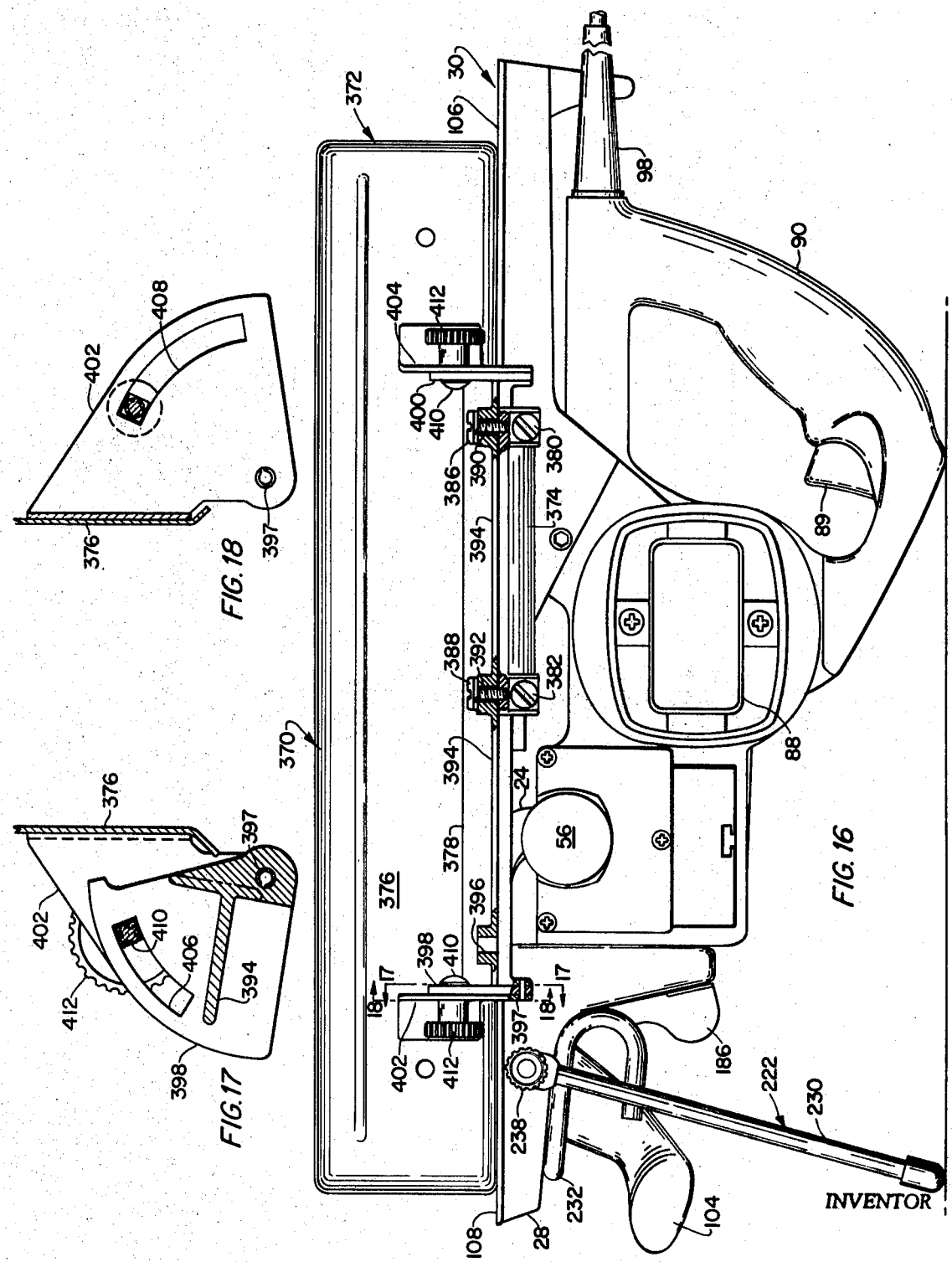

United States Patent Office 3,559,350
Patented Feb. 2, 1971

3,559,350
PLANE ATTACHMENTS
John Gordon Bentley, Liverpool, N.Y., assignor to Rockwell Manufacturing Company, Pittsburgh, Pa., a corporation of Pennsylvania
Filed May 3, 1967, Ser. No. 635,879
Int. Cl. B24b *19/00*
U.S. Cl. 51—241                                                    20 Claims

ABSTRACT OF THE DISCLOSURE

A cutter sharpening attachment for a hand-manipulated, power-operated plane is disclosed herein to comprise a grinding wheel interchangeable with the cutter element of the plane and a frame and cutter mounting arbor assembly which is adapted to be detachably mounted on the plane and which supports a bladed cutter to be sharpened for rotation and reciprocation with respect to an axis extending parallel to the rotational axis of said grinding wheel. For employing the cutter sharpening attachment, the plane is inverted and is supported in its inverted position on suitable surface by one of its handles and a pedestal which is adapted to be detachably secured to the plane. By supporting the plane in its inverted position with the pedestal, the plane may alternately be employed as a jointer by using its shoes as work-support tables and by providing a jointer fence attachment which is adapted to be detachably mounted on the plane.

FIELD OF INVENTION

This invention relates to attachments for planes and more particularly to cutter sharpening and jointer fence attachments for hand - manipulated, power - operated planes

BACKGROUND

Cutter sharpening attachments proposed prior to this invention typically include a grinding wheel assembly adapted to be mounted on the plane in place of the cutter element, an arbor for supporting the cutter to be sharpened by engagement with the grinding wheel and a fixture for positioning the arbor on the plane. Some of these cutter sharpening attachments are very simplified and inexpensive; others are more complicated and costly.

The inexpensive attachments usually are awkward to handle and operate with the result that they do not reliably produce a sharp, well defined blade edge with minimum removal of cutter blade material. The more complicated attachments, while achieving improved results, are difficult to assemble on the plane, are more expensive to manufacture, are sometimes difficult to adjust, and often require cumbersome fixtures for mounting the plane in a position for sharpening the cutter.

SUMMARY OF INVENTION

The present invention provides for a comparatively simplified, cutter sharpening attachment which is easy to assemble, easy to adjust for achieving accurate and reliable results, and easy to operate. Briefly the cutter sharpening attachment of this invention comprises a grinding wheel which is easily and conveniently mounted on the cutter support shaft of the plane in place of the cutter element, a frame assembly which is detachably mounted on a shoe of an inverted plane simply by two fasteners, and a cutter arbor which is adapted to mount a cutter to be sharpened and which is supported on the frame assembly for rotation and reciprocation with respect to an axis extending parallel to the rotational axis of the grinding wheel.

The part of the frame assembly supporting the arbor is easily adjustable laterally of the grinding wheel to accommodate cutters of different diameters. A convenient scale and marker are provided on the frame assembly to directly read the cutter diameter for which the frame part has been adjusted. In addition, the frame assembly is easily pivotally adjustable to raise and lower an arbor mounted cutter to assure that the depth of cut made by the grinding wheel on the cutter blades is minimized.

Other features include a guide on the frame for directing rotation of the cutter in such a manner that a spirally contoured blade is maintained in constant engagement with the grinding wheel throughout a complete traversal of the cutter past the grinding wheel. For spirally bladed cutters, the periphery of the grinding wheel, according to this invention, is tapered to provide a uniform rake angle.

Appropriate markings on the arbor cooperate with a cutter fastening arrangement to assure that the cutter is correctly oriented for proper presentation to the grinding wheel. The cutter, according to this invention, is secured against axial and rotational displacement on the arbor by a single screw which is always threaded in an arbor bore.

Sharpening of a cutter with the attachment of this invention is convenient and easy especially since the plane is inverted with the cutter arbor overlying the upwardly facing work-engaging shoe surfaces of the plane. As a result, an operator has an unblocked view of cutter blades engaging the grinding wheel while he manipulates the cutter arbor.

The present invention further provides for a novel pedestal which is adapted to be detachably secured to the plane and which cooperates with a handle of the plane to firmly support the plane in its inverted position on a bench or other suitable surface. The pedestal of this invention is not required to be removed to perform a planing operation and it is conveniently secured to the plane by the same fasteners which are used to mount the arbor-supporting frame assembly. The sturdy support provided by the pedestal enables the plane to be used as a jointer, and for this purpose a jointer fence attachment is provided.

Accordingly, a major object of this invention is to provide a novel cutter sharpening attachment which is easy to assemble, easy to adjust and convenient to operate.

A more specific object of this invention is to provide a novel cutter sharpening attachment having grinding wheel which is adapted to readily be mounted in the plane in place of the cutter element, a frame assembly which is adapted to be mounted quickly and easily on the plane, and a cutter arbor which is adapted to conveniently mount a cutter and which is supported on the frame assembly for rotation and reciprocation along an axis extending substantially parallel to the rotational axis of the grinding wheel.

Another object of the invention is to provide a novel cutter sharpening attachment wherein the plane is adapted to be supported in an inverted position and wherein a cutter support frame and arbor assembly overlies the upwardly facing shoe surfaces of the plane to afford an unblocked view of cutter engagement with a grinding wheel mounted in the plane.

Still another object of this invention is to provide a novel fastening means for securing a cutter to be sharpened on the cutter-support arbor.

A further object of this invention is to provide novel adjustments for positioning a cutter to be sharpened relative to a grinding wheel.

Another object of this invention is to provide a novel pedestal for supporting a plane in its inverted position.

A related object is to provide a novel jointer fence attachment to facilitate the use of the plane as a jointer when supported in its inverted position.

Further objects of this invention will appear as the description proceeds in connection with the appended claims and annexed drawings wherein:

FIG. 1 is a left-hand side view of a hand-manipulated, power-operated plane containing the cutter sharpening attachment of this invention and being supported in its inverted position for sharpening the blades of a cutter;

FIG. 2 is a fragmentary right-hand side view of the plane shown in FIG. 1 with the blade sharpening attachment removed and with its cutter mounted in place for planing;

FIG. 3 is a horizontal section through the plane of FIG. 2 showing its internal construction;

FIG. 4 is a fragmentary side view of the rearward end of the main housing and the rear shoe of the plane with portions of the housing and shoe broken away to show the manner in which the shoe is supported from the housing and mechanism provided to adjust the shoe up and down relative to the housing;

FIG. 5 is a section taken substantially along lines 5—5 of FIG. 4;

FIG. 6 is a section taken substantially along lines 6—6 of FIG. 1;

FIG. 7 is a section taken substantially along lines 7—7 of FIG. 3;

FIG. 8 is a section taken substantially along lines 8—8 of FIG. 7;

FIG. 10 is a view similar to FIG. 9 but with the cutter support arbor and frame assembly partially broken away to show details of the grinding wheel assembly which is adapted to be mounted in the plane in place of the usual cutter element;

FIG. 11 is a fregmentary bottom plan view of the inverted plane and blade sharpening attachment shown in FIG. 1;

FIG. 14 is a section taken substantially along lines 14—14 of FIG. 9;

Figure 9:
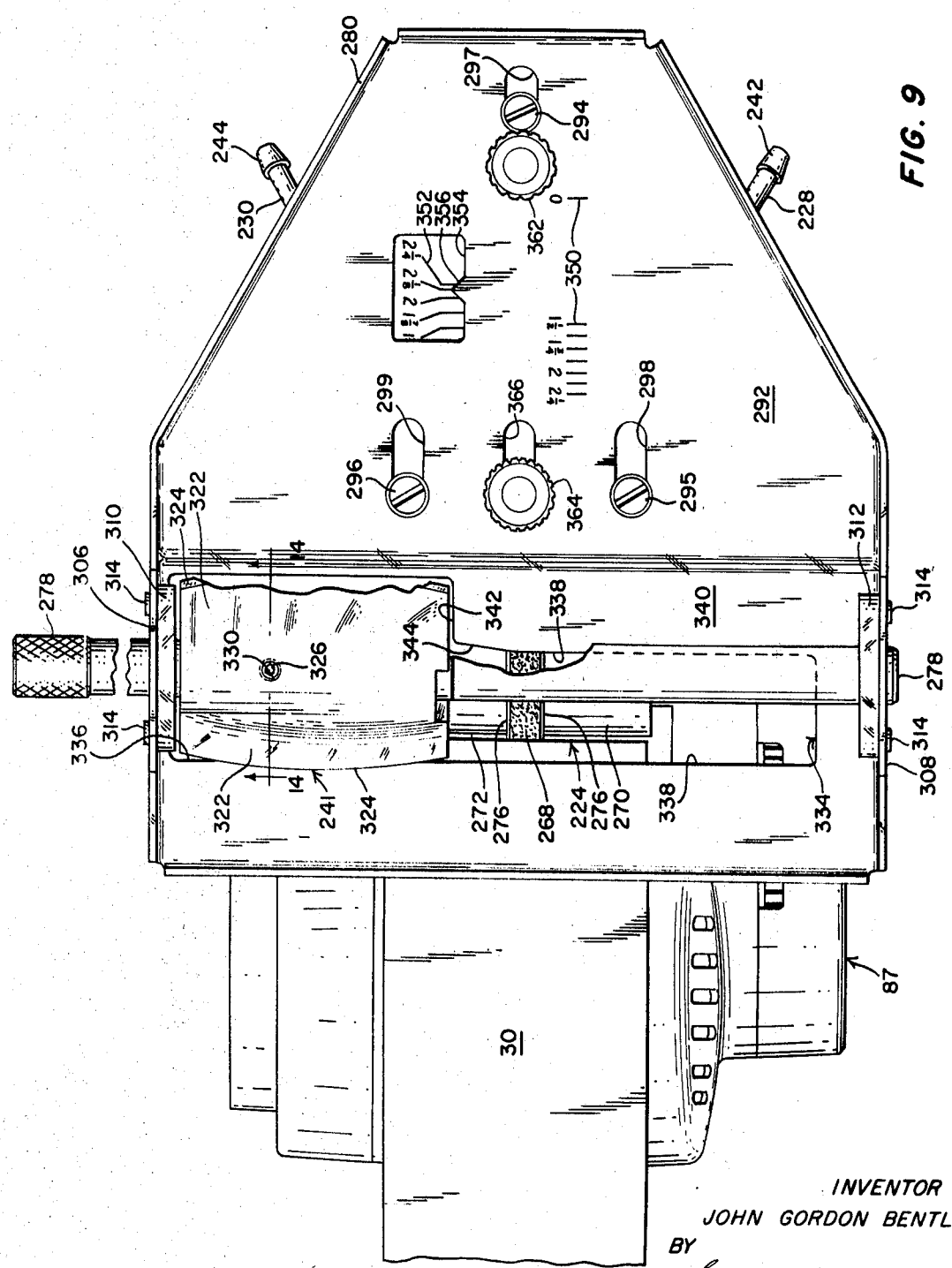
FIG. 9 is a fragmentary top plan view of the inverted plane and the blade sharpening attachment shown in FIG. 1.

FIG. 16 is a right-hand side elevation of the plane and jointer attachment shown in FIG. 1; and FIGS. 17 and 18 are sections respectively taken along lines 17—17 and 18—18 of FIG. 16.

The plane construction will be described first followed by the detailed description of the attachments of this invention.

Referring now to the drawings, FIGS. 2 and 3 depict a hand-manipulated, power-operated plane 20 having a housing 22 in which a one-piece, spiral type, rotating steel cutter 24 is normally mounted together with a motor 26 drive-connected to the cutter. Attached to the front and rear ends of housing 22 are adjustable front and rear shoes 28 and 30 which position cutter 24 relative to the surface of the workpiece being planed and which therefore control the depth of the cut made by the cutter. An adjusting mechanism 31 is provided so that the depth of cut can be varied as needed for particular tasks.

In FIG. 3, cutter 24 is shown in this embodiment to be of integral construction having a central body portion or mandrel 32 and two oppositely disposed spiral or helical cutting edges 34. A bore is formed axially through the cutter as shown. This type of cutter is usually referred to as a solid cutter.

Cutter 24 is journalled on a shaft 36 which extends through a central bore 38 in the cutter. Cutter 24 is nonrotatably fixed to shaft 36 by lugs 40 (only one shown). Lugs 40, which are formed on shaft 40, fit into correspondingly configured recesses 42 (only one of which is shown) in the cutter.

The opposite ends of shaft 36 are rotatably journalled in frictionless bearings 44 and 46. Bearing 44 is mounted in a recess 40 formed in a transversely extending boss 50 of housing 22 and is retained in place by a retainer ring 52. Bearing 46 is seated in a recess 54 which is formed in a removable dust cap 56. Cap 56 is attached to housing 22 by screws 57. Bearing 46 is frictionally retained in recess 54 by rubber plugs 58 (only one of which is shown) disposed in apertures 60 opening onto recess 54. Plugs 58 also absorb and reduce vibration from cutter 24.

Shaft 36 is located transversely in housing 22 by a pinion 62 threaded onto one end of the shaft and by retainer 52, bearing 44, and a shoulder 64 on the shaft adjacent to bearing 44. Pinion 62 and bearing 44 prevent shaft 36 from moving downwardly, as viewed from FIG. 3, since bearing 44 bears against a seat 66 at the inner end of recess 48. Retaining ring 52 prevents the bearing from moving upwardly as viewed from FIG. 3. Shaft 36, consequently, cannot move upwardly because of the engagement between its shoulder 64 and bearing 44.

Cutter 24 is positioned along shaft 36 at one end by cooperating lugs 40 and recesses 42 and, at the other, by a nut 68, a washer 70, bearing 46, and a spacer 72, which maintain firm engagement between the cutter and lugs 40 on shaft 36.

The cutter mounting arrangement described above permits the cutter to be quickly and easily removed for sharpening. Specifically, after cap 56 and nut 68 are removed, washer 70, bearing 46, spacer 72, and cutter 24 can be slid off shaft 36 and removed through opening 73 in housing 22.

Referring still to FIG. 3, motor 26 is of conventional construction and is mounted transversely in housing 22. The motor is fixed in place by screws 74, which are threaded into a mounting boss 76 on the inside of the housing, and by a conventional frictionless bearing 78 in which motor output shaft 80 is journalled. Bearing 78, in turn, is mounted in a recess 81 formed in a boss 82 extending inwardly from housing 22.

A drive pinion 84 is threaded onto motor output shaft 80 and rotates with the latter along with a conventional fan 85 provided to prevent the motor from overheating. Pinion 84 is connected to the pinion 62 on cutter shaft 36 by an endless, flexible toothed belt 86 thus drive connecting motor 26 to cutter 24. A removable cover 87 protects the drive train against dust generated by the cutter and other foreign matter. A similar cover 88 protects motor 26 while facilitating access to it when necessary.

Motor 26 is energized by depressing a switch 89 mounted in a handle 90 having one section 92 (FIG. 2) integral with housing 22 and a second section 94 (FIG. 1) removably attached to section 92 as by screws 96. Removal of handle section 94 exposes the leads (not shown) connecting motor 26 to switch 89 and the connections between the switch and flexible power cord 98 provided with an unshown plug for connecting the plane to a source of alternating current. An upstanding integral projection 102 (see FIG. 1) at the aft end of rear shoe 30 biases cable 98 to one side or the other to prevent it from interfering with the operation of plane 20.

The operation of the plane 20 described above is thought to be apparent from the foregoing description of its major components. Briefly speaking, however, plane 20 is positioned with front shoe 28 on the surface of the workpiece (not shown) from which it is desired to remove a cut. Switch 89 is then closed, energizing motor 26 which, in turn, drives cutter 24. The operator then pushes plane 20 along the workpiece by means of handle 90 and a T-shaped handle 104 fixed in any convenient fashion to front shoe 28. Cutter 24 removes a cut of material of a thickness determined by the adjustment of mechanism 31 from the workpiece as plane 20 is moved along it. After the plane has moved a short distance, rear shoe 30 will move onto the planed surface and will ride over it.

By sharpening cutter 24, its diameter is reduced, and it is therefore necessary to realign the front and rear shoes 28 and 30 of the plane relative to the cutter. This is accomplished by elevating the rear shoe until its work engaging surface 106 is tangent to the periphery of the cutter. Front shoe 28 is then adjusted so that its work engaging surface 108 is in the same plane as the work engaging surface 106 of the rear shoe.

Referring now to FIGS. 4 and 5, rear shoe 30 is sildably mounted on housing 22 by two longitudinally extending, parallel ways or recesses 110 formed in the rear part of the housing. Ways 110, which are inclined at an angle (typically on the order of 30 degrees) to the longitudinal centerline of plane 20, provide outwardly directed shoe supporting projections 112. Cooperating, inwardly extending projections 114 and 116 are formed in triangularly configured side walls 117 and 118 of shoe 30. As best shown in FIG. 5, this provides a dovetail arrangement which supports rear shoe 30 from housing 22 of plane 20 while permitting the shoe to move longitudinally of the housing.

Movement of rear shoe 30 relative to housing 22 elevates or lowers its work engaging surface 106 relative to the periphery of cutter 24, thereby permitting the rear shoe to be adjusted with respect to the cutter periphery for the purposes described above. To accurately control the longitudinal movement and, therefore, the raising and lowering of the shoe, a cooperating rack 119 and pinion 120 are employed. Rack 119 extends longitudinally of the plane and is fastened to inclined lower surface 122 of housing 22 between shoe supporting projections 112 as by screws 124.

Pinion 120 is fixed to a transversely extending shaft 126 for rotation therewith. Shaft 126 is supported with pinion 120 and rack 119 in meshing engagement in openings 128 and 130 in the side walls 117 and 118 of shoe 30. Shaft 126 is retained in place by an annular shoulder 132 on it, which abuts side wall 117, and a snap ring retainer 134 disposed in an annular groove 136 in the shaft adjacent shoe side wall 118.

As best shown in FIG. 4, a hexagonal socket 138 is formed in the outer end 140 of shaft 126. Accordingly, shaft 126 and pinion 120 may be rotated by an Allen wrench or the like.

As will be apparent from the foregoing, rear shoe 30 is adjusted relative to the periphery of cutter 24 by turning shaft 126. Shaft 126, in turn, rotates pinion 120, causing it to roll along rack 119. This moves shoe 30 along the ways 110 formed in plane housing 22, raising or lowering the rear shoe relative to the periphery of cutter 24.

Rear shoe 30 is retained in the position to which it is adjusted by a setscrew 142 which is threaded through side wall 118 of shoe 30. A hexagonal socket 144 on its outer end permits it to be conveniently rotated by an Allen wrench. As best shown in FIG. 6, the inner end of screw 142 engages a wear plate 146 disposed between rear shoe side wall 118 and the adjacent projection 112 on housing 22. A blind aperture 148 is provided in wear plate 146 to receive the inner end of screw 142 and thereby prevent the wear plate from moving relative to shoe 30. When screw 142 is tightened, wear plate 146 is clamped against housing projection 112; and the resulting friction prevents shoe 30 from moving relatve to the housing.

After rear shoe 30 has been adjusted in the manner just described, the work engaging surface 108 of front shoe 28 can be adjusted to the same plane as the work engaging surface of the rear shoe without using depth of cut adjusting mechanism 31.

As shown in FIGS. 2, 6 and 7, front shoe 28 is attached by the depth of cut adjusting mechanism 31 to a front shoe mounting bracket 150. Shoe mounting bracket 150 is attached to the front vertical wall 152 of plane housing 22 by two Allen head screws 154. Screws 154 extend through vertically elongated apertures 156 in bracket 150 with their heads abutting ledges 158 in the recesses and are threaded into housing wall 152.

To align the work engaging surface 108 of front shoe 28 with the work engaging surface 106 of rear shoe 30, depth of cut adjusting mechanism 31 is set to the zero cut position. Allen head screws 154 are then loosened, and mounting bracket 150 is moved up or down until the work engaging surface 108 of front shoe 28 lies in the same plane as the work engaging surface 106 of the previously adjusted rear shoe 30. Allen head screws 154 are then tightened to retain the mounting bracket in the adjusted position.

From the foregoing, it will be apparent that the depth of cut adjusting mechanism 31 remains in its zero position while the foregoing adjustment is being made. Accordingly, this adjustment neither effects the zero position of the latter mechanism nor reduces the maximum depth of cut which may be made.

To confine front shoe mounting bracket 150 to up and down movement relative to plane housing 22, a vertically extending lug or projection 160 is formed on front wall 152 of the housing. This lug fits into a correspondingly configured recess 162 in the mounting bracket and, accordingly, limits the relative movement between the two components to that desired.

With front and rear shoes 28 and 30 of plane 20 aligned in the manner described above and depth of cut adjusting mechanism 31 set to its zero position, the work engaging surfaces 108 and 106 of the two shoes lie in the same plane as the periphery of cutter 24. Consequently, no wood will be removed by cutter 24 in this setting. Plane 20 is accordingly next adjusted so that it will take a cut as it is moved over the workpiece. This is done by manipulating adjusting mechanism 31 to elevate front shoe 28 relative to its mounting bracket and expose cutter 24 to a depth equal to the desired depth of cut.

As shown in FIGS. 1, 2, and 6–8, mechanism 31 includes a threaded shaft or bolt 174 with its head 176 seated in a recess 178 on the rear side of bracket 150. Recess 178 has a configuration (not shown) matching that of the bolt head to prevent it from rotating relative to the mounting bracket.

As best shown in FIG. 7, bolt 174 extends forwardly from bracket 150 through an aperture 180 in a vertical transverse wall member 181 of shoe 28 provided with slots 182 through which Allen head screws 154 can be reached. Rotatably mounted on bolt 174 in aperture 180 is an eccentric or cam 183 with a peripheral cam surface 184 and an integral handle 186 by which the cam may be rotated. A washer 188 is disposed between handle 186 and the vertical transverse wall 181 of front shoe 28 to prevent the latter from binding as it is rotated relative to the shoe.

Cam 183 is connected in motion transmitting relationship to front shoe 28 by a rectangularly configured insert 190 which surrounds the cam and is also disposed in the aperture 180 through wall 181 of the shoe. As best shown in FIG. 8, the central aperture 192 of the insert, through which cam 183 extends, is of virtually the same dimensions as the cam. The vertical dimensions of insert 190 and aperture 180 are approximately the same, but aperture 180 is considerably wider.

To elevate front shoe 28 to provide the desired depth of cut, lever or handle 186 is moved counterclockwise as shown in FIG. 8, rotating cam 183 in the direction shown by arrow 194. Rotation of cam 183 in this direction moves front shoe 28 upwardly relative to supporting bracket 150 since it increases the distance between the fixed axis of rotation 196 and the periphery 184 of the cam. This moves insert 190 upwardly with respect to the center of rotation which, in turn, moves the front shoe upwardly relative to axis 196 and supporting bracket 150 since there is no relative movement between the bracket and axis 196.

Front shoe 28 is confined to vertical or up and down movement relative to its mounting bracket 150 by a vertically extending projection 197 on the front face of the bracket, which fits into a correspondingly configured, vertically extending recess 98 in the rear face of the transverse wall 181 of shoe 28. With shoe 28 thus confined to up and down movement, insert 190 slides laterally in recess 178 as the horizontal distance between axis 196 and cam surface 184 increases, preventing cam 183 from binding.

Referring to FIG. 3, a pointer 199 is formed on lever 186, and a cooperating scale 200 is stamped or otherwise formed in the top surface 202 of the transversely extending front shoe wall 181. The pointer and scale indicate the depth of cut for which the plane is set. Since pointer 199 remains at zero on this scale while the front shoe is being adjusted to compensate for changes in cutter diameter, the pointer and indicator always indicate the precise depth of cut which will be made by the plane.

Referring now to FIG. 7, two plane washers 204 and two pairs of spring washers 206 are assembled on bolt 174 adjacent cam lever 186 with the two spring washers in each pair arranged in mirror image relationship. The foregoing washers, as well as the other components assembled on the bolt and described previously, are retained on it by a nut 208.

Spring washers 206 bias lever 186 against washer 188 and the latter against transversely extending wall 181 of front shoe 28. This provides frictional forces between the operating lever and shoe 28 and between shoe 28 and mounting bracket 150 capable of maintaining the shoe in the position to which it is adjusted. This force can be adjusted, if necessary, by threading nut 208 along bolt 174.

Figure 12:
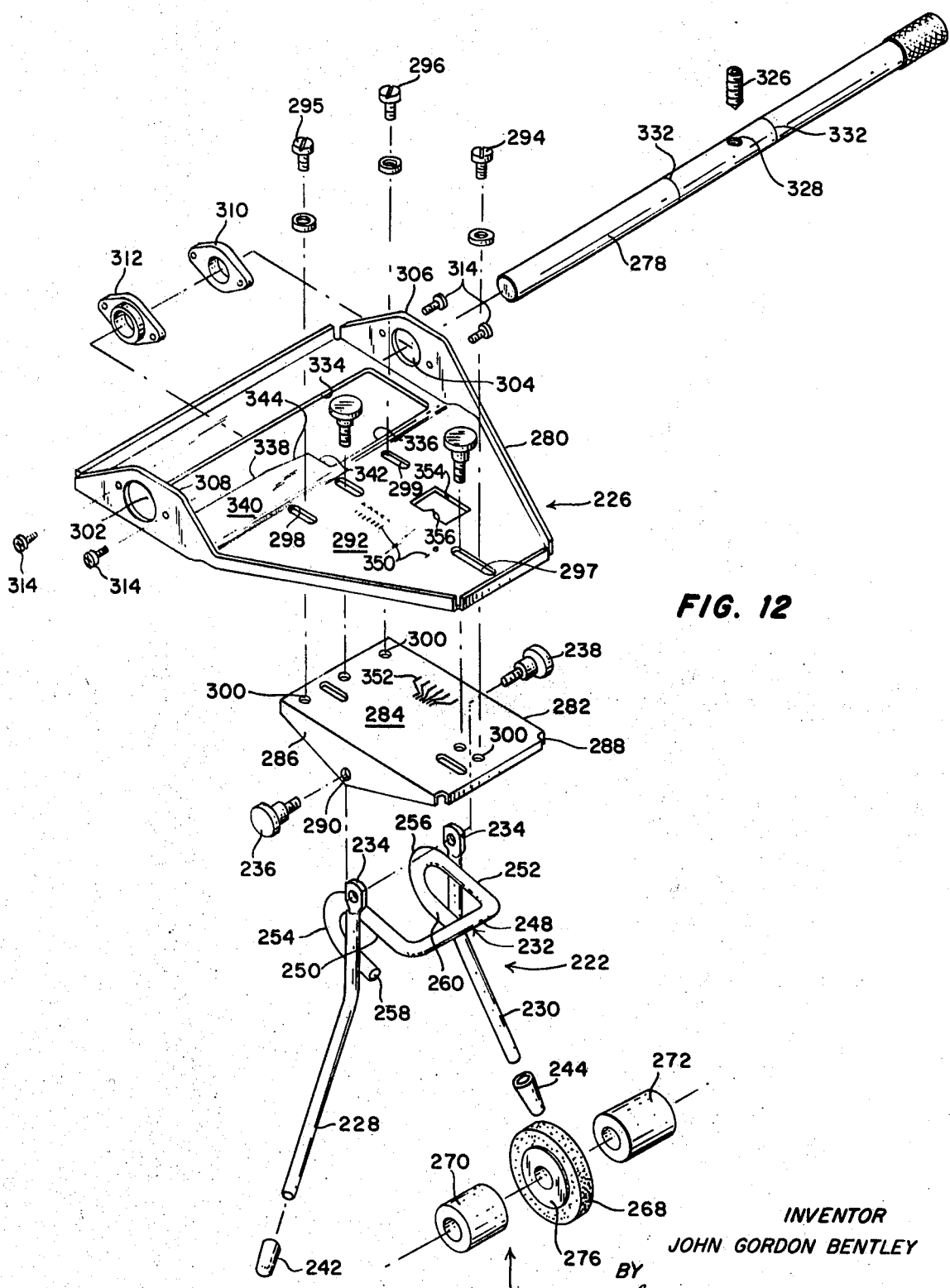
FIG. 12 is an exploded view of the components which make up the blade sharpening attachment shown in FIG. 1.

In accordance with this invention, a cutter sharpening attachment 220, as shown in FIGS. 1, 9 and 12, is provided for use with plane 20 and comprises a pedestal 222 for supporting plane 20 in an inverted position on a bench surface or the like, a grinding wheel and spacer assembly 224 (see FIGS. 10 and 12) which is adapted to be mounted on shaft 36 in place of cutter 24, and a frame or holder assembly 226 which is adapted to support a cutter 24' to be sharpened on front shoe 28.

As best shown in FIG. 12, pedestal 222 is formed with a pair of support legs 228 and 230 which are rigidly joined together at their upper ends by a cross piece 232. Legs 228 and 230, which are of identical construction, are formed from cylindrical rods having flattened end sections 234. Thumb screws 236 and 238 extend through apertures in end sections 234 and are threaded into axially aligned, oppositely opening, tapped bores 240 (only one of which is shown in FIG. 2) which are formed in the opposite side walls of front shoe 28.

Feet 242 and 244 tightly fit on the lower cylindrical ends of legs 228 and 230 and are adapted to engage a support surface which is indicated at 246 in FIG. 1. Feet 242 and 244 preferably are made of hard rubber or like material to provide a firm, frictional engagement with support surface 246 for resisting movement of plane 20 during its operation.

Legs 228 and 230 depend from opposite sides of front shoe 28 and are bent laterally, outwardly at equal acute angles with respect to a vertical, medial plane. The support faces of feet 242 and 244 are thus spread laterally outwardly from opposite sides of front shoe 28 or resisting tilting movement of plane 20 to one side or the other.

Cross piece 232, as best shown in FIG. 12, comprises a cylindrical rod having an intermediate, U-shaped, loop section 248 which opens rearwardly towards shoe 30 and which is formed with a pair of parallel legs 250 and 252 longitudinally extending on opposite sides of handle 104.

The ends of legs 250 and 252 are reversely bent in parallel vertical planes to define terminal, U-shaped sections 254 and 256 which open towards the front end of plane 20. Sections 254 and 256 respectively terminate in legs 258 and 260 which are disposed vertically below legs 250 and 252.

Leg 228 is rigidly fixed, as by welding or other suitable means, at vertically spaced apart regions to legs 250 and 258. Leg 230 similarly is rigidly fixed, as by welding or other suitable means, at vertically spaced apart regions to legs 252 and 260.

When pedestal 222 is detachably mounted on shoe 28 by screws 236 and 238, loop section 248 extends around handle 104 and seats against the surface of shoe 28 which faces downwardly when plane 20 is in its inverted position shown in FIG. 1. Loop section 248 is contained in a plane which normally intersects parallel planes containing sections 254 and 256. Sections 254 and 256 interfittingly nest in the curve portion of shoe 28, which is indicated at 262 in FIG. 1.

The foregoing pedestal construction minimizes the extent and number of protrusions that might be inadvertently engaged to upset the plane. It also avoids interference with the normal operation of plane 20 when the plane is turned right-side up as shown in FIG. 2. Both pedestal 222 and handle 104 are uniquely constructed and arranged to enable an operator to easily grip the handle for manipulating the plane whether it be in the upright position shown in FIG. 2 or in the inverted position shown in FIG. 1.

Pedestal 222 in essence coacts with handle 90 to form a tripod support for plane 20. For this purpose, handle 90 has a generally triangular configuration in side elevation to form an apex which is indicated at 266 in FIG. 1 and which is adapted to seat on support surface 246. Legs 228 and 230 are symmetrically disposed on opposite sides of a medial plane extending longitudinally of plane 20 and passing through apex 266. This arrangement thus provides for a well-balanced three-point support for plane 20 when it is turned to its inverted position and seated on a suitable support surface.

As shown in FIGS. 10 and 12, assembly 224, which is adapted to be mounted on shaft 36 in place of cutter 24, comprises a grinding wheel 268 and a pair of annular spacers 270 and 272. Spacers 270 and 272 and grinding wheel 268 are slidably mounted on shaft 36 with spacers 270 and 272 being respectively disposed adjacent to the pinion end of shaft 36 and to dust cap 56. Spacer 270 is internally formed with a recess 274 which interfittingly receives lug 40 on shaft 36. This engagement with lug 40 limits axial displacement of spacer 270 towards pinion 62. Grinding wheel 268 is axially clamped between opposing end faces of spacers 270 and 272. Spacer 272 seats against spacer 72 as best shown in FIG. 10.

The assembly of spacers 270 and 272 and grinding wheel 268 is axially confined against displacement on shaft 36 by engagement with spacer 72 at one end and by engagement with lug 40 in recess 274 at the other end. Paper friction washers 276 are mounted on shaft 36 and are axially confined between each spacer and the opposing side of grinding wheel 268. By tightening nut 68 after spacers 270 and 272, grinding wheel 268 and washers 276 are mounted in place, the assembly 224 is securely clamped axially in place.

Spacer 270 is non-rotatably secured on shaft 36 by engagement with lug 40. When grinding wheel 268 and washers 276 are tightly clamped between the opposing ends of spacers 270 and 272 by tightening nut 68, wheel 268 and spacers 270 and 272 all rotate as a unit through the friction-engaging surfaces provided by washers 276. Thus a simplified drive connection is provided between the cutter support shaft 36 and grinding wheel 268 by the spacer and paper washer sub-assembly.

Referring to FIGS. 9–12, assembly 226 is shown to comprise a cutter arbor 278, a rigid frame 280 for mounting arbor 278, and a frame support bracket 282 for detachably mounting frame 280 on front shoe 28. Bracket 282, as best shown in FIGS. 1, 11 and 12, is integrally formed with a flat-sided plate section 284 and a pair of parallel, depending ears 286 and 288 which extend on opposite sides of front shoe 28. Plate section 284 is adapted to overlie the work-engaging surface 108 of shoe 28 and is contained in a plane which extends at right angles to planes containing ears 286 and 288. Ears 286 and 288 are formed with axially aligned apertures 290 (only one of which is shown in FIG. 12) through which screws 236 and 238 extend. Ear 286 is axially clamped between an annular shoulder or screw 236 and end section 234 of leg 228. Ear 288 similarly is axially clamped between an annular shoulder on screw 238 and end section 234 of leg 230. Bracket 282 is thus secured to front shoe 28 by tightening screws 236 and 238.

As best shown in FIGS. 9 and 12, frame 280 is secured to bracket 282 by a set of three screws 294, 295, and 296 and is formed with a flat plate section 292 which is seated on plate section 284 of bracket 282. Screws 294–296, which respectively extend through slots 297, 298 and 299 in plate section 292, are threaded into tapped holes 300 which are formed in plate section 284 of bracket 282. Slot 297 is elongated along an axis which aligns with the longitudinal plane axis medially intersecting shoes 28 and 30. Slots 298 and 299 are symmetrically disposed on opposite sides of the longitudinal axis of the plane and are elongated along axes which are parallel with the longitudinal axis of slot 297. Screws 294–296 are sufficiently short that they do not engage surface 108 of front shoe 28 when tightened to firmly secure frame 280 to bracket 282.

By loosening screws 294–296, the position of frame 280 may be adjusted parallel to the longitudinal axis of the plane. The purpose of this adjustment will be explained in detail later on.

Still referring to FIGS. 9 and 12, arbor 278 comprises a cylindrical rod and freely extends through axially aligned apertures 302 and 304 which are respectively formed in upstanding walls 306 and 308. Arbor 278 is rotatably and reciprocably supported by bearings 310 and 312 which are respectively secured to walls 306 and 308 by screws 314.

Walls 306 and 308, which form a part of frame 280, integrally extend upwardly from opopsite side edges of plate section 292 and are spaced widely apart and laterally beyond the opposite sides of plane 20. As shown, walls 306 and 308 extend at right angles to the longitudinal axis of arbor 278. The longitudinal axis of arbor 278 is substantially parallel with the rotational axis of grinding wheel 268 when frame 280 is secured in place on bracket 282 by screws 294–296.

Cutter 24′, which is adapted to be sharpened by using attachment 220, may, as shown in FIG. 9, be of the same construction as cutter 24 and is formed with spirally contoured, radial blades 322 which terminate in cutting edges 324. Cutter 24′ is mounted on arbor 278 by a set screw 326. Screw 326 is threaded into a tapped bore 328 (see FIGS. 12 and 14) which is formed radially through arbor 278. When fully threaded into bore 328, the forward end of set screw 326 extends into an aligning radial bore 330 (see FIG. 14) which is formed through the mandrel or body portion of cutter 24′ and which normally intersects the shaft-receiving, cutter bore through which arbor 278 coaxially extends. Engagement of screw 326 with the cylindrical wall of bore 330 thus secures cutter 24′ against both axial and rotational displacement on arbor 278. Screw 326 may be turned by inserting an Allen wrench or like tool through a bore 330a which is formed radially through the mandrel of cutter 24′ and which aligns with bore 330.

To assure that cutter 24′ is properly oriented for engagement with grinding wheel 268, bore 328 is disposed between a pair of circumferential, axially spaced apart, scribe marks 332 which are formed on the periphery of arbor 278. Scribe marks 332 are spaced axially apart by a distance substantially equal to the length of cutter 24′. Bore 328 is axially closer to one of the scribe marks than to the other. As a result, bore 330 aligns with bore 328 only when cutter 24′ is axially oriented in a predetermined position relative to grinding wheel 268 and to the direction in which the arbor is to be axially displaced for bringing cutter 24′ into blade-sharpening engagement with the grinding wheel. Thus, when cutter 24′ is contained between scribe marks 332 and is secured to arbor 278 by screw 326, only the backs of teeth 322 will engage the periphery of grinding wheel 268 as the cutter is displaced axially back and forth over the grinding wheel. The position of scribe marks 332 in cooperation with screw 326 and bores 328 and 330 thereby assures that the cutter 24′ is mounted for proper presentation to the grinding wheel.

Figure 13:
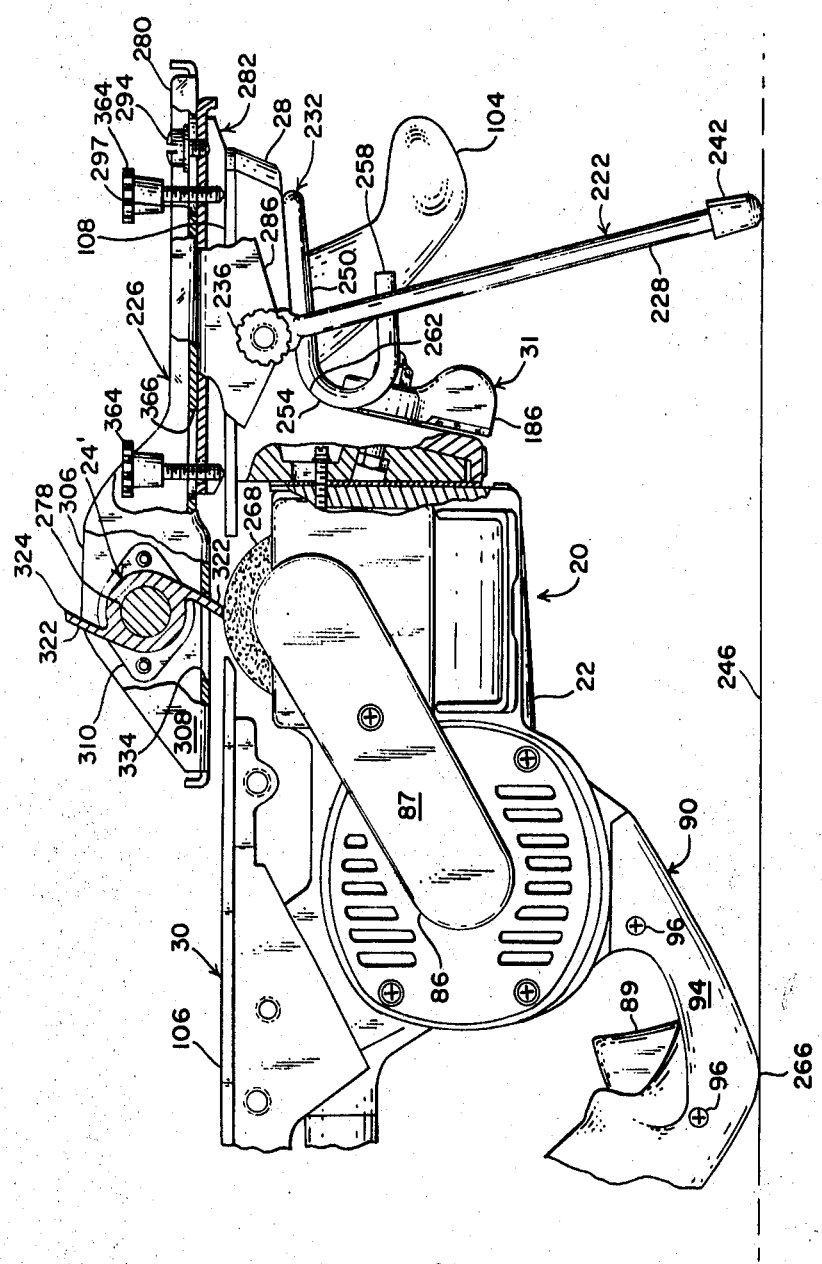
FIG. 13 is a fragmentary side view similar to FIG.1 but having parts of the planar and the attachment broken away to illustrate interior details.

As best shown in FIG. 13, arbor 278 is supported by bearings 310 and 312 above grinding wheel 268, and the blades of cutter 24′ are each adapted to extend freely through an irregularly-shaped aperture 334 which is formed in the frame plate section 292 between walls 306 and 308. Aperture 334, as best shown in FIGS. 9 and 12 is elongated in a direction that is parallel to the longitudinal axis of arbor 278 and is formed with two merging, generally rectangular window sections 336 and 338. Window section 336 is disposed between wall 306 and one side of grinding wheel 268 and is transversely enlarged to permit cutter 24′ to be rotated through an angle of 360 degrees by manipulating arbor 278.

The width of window section 338 is narrowed by a rearwardly extending, horizontal ledge 340 which forms an integral part of plate section 292 and which extends from a region adjacent to wall 308 to a region disposed laterally beyond grinding wheel 268. The side edge 342 of ledge 340 facing wall 306 delimits window section 336 to effectively define a step between the two window sections.

As best shown in FIG. 9, cutter 24′ will partially overlie ledge 340 when the cutter is shifted away from window section 336 towards wall 308. With this construction, rotation of cutter 24′ in one direction will bring the blade not being engaged by grinding wheel 268 into abutment with the top face of ledge 340. Rotation of cutter 24′ in the opposite direction will displace the other cutter blade into engagement with the rearward edge of ledge 340 if arbor 278 is raised sufficiently high to allow the cutter blade to clear the periphery of grinding wheel 268. It therefore is clear that cutter 24′ when positioned over window section 338 cannot be rotated sufficiently far to bring the second blade into engagement with grinding wheel 268. To do this, cutter 24′ must be axially shifted to a position where it is over window section 336 which is slightly longer than the axial length of the cutter. Since ledge 340 extends laterally beyond both sides of grinding wheel 268 it is evident that when the operator positions cutter 24′ to engage one of the cutter blades with grinding wheel 268 he cannot rotate the cutter to engage the other cutter blade unless he first withdraws the cutter to a position where it is over window section 336. This aperture configuration thereby prevents the operator from rotating the second cutting edge into engagement with grinding wheel 268 until after he has pulled cutter 24′ completely across the grinding wheel.

Still referring to FIGS. 9 and 12, ledge 340 is formed at the corner adjacent to side edge 342 with a rearwardly facing, cutter guide edge 344 which is inclined at an acute angle relative to the longitudinal axis of arbor 278. Guide edge 344 converges towards the opposed forwardly facing edge of aperture 334 in the direction of cutter advancement towards wheel 268 and wall 308. This guide edge is utilized by the operator for sharpening spirally contoured cutter blades of the type shown in the drawings. The method of grinding cutter 24' with the attachment of this invention will be described later on.

Before grinding wheel assembly 224 is installed in plane 20, it is only necessary to remove cutter 24. This is done by removing cap 56, nut 68, bearing 46 and spacer 72. Cutter 24 then can be slid off shaft 36 in the manner previously described.

Following the removal of cutter 24, grinding wheel assembly 224 is mounted in the plane by sliding spacer 270 onto shaft 36 followed, in sequence, by one of the washers 276, grinding wheel 268, the other washer 276, and finally spacer 272. Spacer 72 is next mounted on shaft 36 followed by bearing 46. Nut 68 is then threaded on the end of shaft 36 and tightened to axially secure assembly 224 in place. Finally, cap 56 is replaced on the cutter housing.

At this stage, it is preferable to set the plane depth adjusting lever 186 to its zero position and to adjust front shoe 28 until surface 108 is level with the top of grinding wheel 268 when the plane is in its inverted position as shown in FIG. 1. After the foregoing adjustments have been made, pedestal 222 preferably is positioned in place on front shoe 28 by first setting the plane in an upright position on a bench surface and then grasping legs 228 and 230 to guide section 248 so that it will pass under the horizontal portion of handle 104 and around the shank portion of the handle. With pedestal 222 positioned in place, but before inserting screws 236 and 238, plane 20 is inverted to the position shown in FIG. 1 so that it is supported by pedestal 222 and the apex 266 of handle 90. Pedestal 222 is held in its support position by engagement of cross piece 232 with the now downwardly facing surface of shoe 28 and engagement of the upper, yieldable ends of legs 228 and 230 with the sides of shoe 28.

With the plane turned upside down so that it rests on the rubber feet 242 and 244 and the apex of handle 90, the assembly of frame 280 and bracket 282 are mounted on front shoe 28 by threading screws 236 and 238 into bores 240 in the sides of shoe 28. It will be noted that frame 280 is detachably mounted on bracket 282 by screws 294–296 as previously described.

Before the cutter to be sharpened is mounted on arbor 278, its diameter is first measured. This measurement is conveniently acquired by providing a scale 350 which, as best shown in FIG. 9, is formed on plate section 292 of frame 280. Scale 350 is provided with a zero graduation line as well as parallel 1 and 1½, 1¾, 2 and 2¼ inch graduations in this embodiment. The cutter to be sharpened is set endwise on frame 280 and the tip of one of its cutting edges is lined up with the zero graduation. The cutter diameter is then conveniently read where the tip of the other cutting edge intersects one of the graduation lines at the other end of the frame. Frame 280 is now adjusted for the measured diameter of the frame 280 is adjusted.

To assure proper adjustment of frame 280 to the measured diameter of the cutter to be sharpened, a scale 352, as best shown in FIG. 9, is formed on bracket 282 and is visible through a window 354 which is formed in plate section 292. An indicating marker 356 formed integral with plate section 292 at the edge of aperture 354 cooperates with scale 352 to provide a direct, convenient, and unblocked view of the cutter diameter for which frame 280 is adjusted.

After measuring the cutter diameter in the manner described above, screws 294–296 are loosened and frame 280 is then shifted along a path extending at right angles to the rotational axis of shaft 36 until pointer 356 aligns with the graduation in scale 352 which corresponds to the measured cutter diameter. Screws 294–296 are then tightened to securely lock frame 280 in its adjusted position.

Before cutter 24' is mounted on arbor 278, the smooth end of the arbor is inserted through bearing 310, but not through bearing 312. Cutter 24' is then mounted on arbor 278 by sliding it over the free arbor end between the two arbor-support bearings on frame 280. Cutter 24' should be so oriented that when it is positioned between scribe marks 332, bore 330 axially aligns with bore 328. The smooth end of arbor 278 is next inserted through bearing 312 so that the arbor is fully supported on frame 280. Arbor 278 is provided with a knurled head 360 which is adapted to be grasped by the operator and which is adapted to seat against bearing 310 to limit axial displacement of arbor 278 in a direction extending towards wall 308.

Cutter 24' is next positioned between scribe mark 332 with bore 330 in axial alignment with bore 328. Screw 326, which is already in bore 328 is then threaded in a clockwise direction to advance its conical end into bore 330 to thus secure cutter 24' against rotation or axial displacement on the arbor. In this position, cutter 24' is oriented for proper presentation to grinding wheel 268. The length of screw 326 is smaller than the diameter of bore 328. It thus may be threaded to a position where it clears both bores 330 and 330a and the internal periphery of cutter 24', allowing the cutter to be removed from arbor 278. Therefore, it is clear that screw 326 always remains threaded in bore 328 even after cutter 24' is removed. As a result, loss or misplacement of screw 326 is avoided.

Walls 306 and 308 are spread sufficiently far apart that cutter 24', when mounted on arbor 278, can be positioned axially to either side of grinding wheel 268. The relative spacing and dimensions of parts are such that engagement of head 360 with bearing 310 does not prevent cutter 24' from being axially shifted to the far side of grinding wheel 268.

With the cutting edges of cutter 24' parallel to the surface of frame 280, the operator next positions the cutter so that its left-hand end, when viewed from the rear of plane 20, is located over the right end of grinding wheel 268. The operator then twists cutter 24' by manipulating arbor 278 until the cutting edge of one blade comes down in contact with the grinding wheel. The cutting edge should just barely touch wheel 268. If this is not the case, an adjustment is provided by a pair of screws 362 and 364 as shown in FIGS. 10 and 13.

Screw 362, as best shown in FIG. 13, freely extends through slot 297 and is vertically threaded through a tapped hole in bracket 282. Screw 364 extends freely through a slot 366 in frame 280 and is also threaded through a tapped hole in bracket 282. The longitudinal axis of slot 266 aligns with that of slot 297. Slot 366 is positioned between slots 298 and 299. Slots 366 and 297 are respectively disposed rearwardly and forwardly of the aligned axes of screws 236 and 238. The longitudinal axes of screws 362 and 364 are parallel as shown.

Bracket 282 is rotatably supported on screws 236 and 238 so that the entire assembly of bracket 282, frame 280, and arbor 278 is rockable about the aligned axes of screws 236 and 238. To rock this assembly, it may be necessary to first loosen screws 236 and 238 slightly.

The ends of screws 362 and 364 seat against surface 108 of shoe 28. Thus when one screw is threaded in and the other screw is threaded out, assembly 226 is rocked about the aligned axes of screws 236 and 238 to vary the height of cutter 24' relative to grinding wheel 268. As a result, the depth of cut to be made by pulling cutter 24' across wheel 268 can be adjusted. The optimum adjustment, as previously mentioned, is where the cutting edge barely touches the periphery of grinding wheel 268. After it has been adjusted, assembly 226 is fixed against rocking motion by seating engagement of screws 362 and 364 with shoe surface 108.

To grind cutter 24', cord plug of the plane is connected to a power circuit, the cutter is positioned between bearing 312 and wheel 268, and the motor is energized by squeezing the switch trigger indicated at 89. Grasping the knurled end of arbor 278, the operator now gently twists the arbor until one cutting edge contacts wheel 268. This twisting motion will be in a clockwise direction as viewed from the knurled end of the arbor. The operator continues to twist arbor 278 in this direction to place and keep the back of the cutter blade against edge 344. Concomitantly with this twisting motion, he pulls cutter 24' across grinding wheel 268 keeping the back of the blade in guided engagement with edge 344.

For spirally contoured cutter blades, grinding wheel 268, as best shown in FIG. 10, is advantageously tapered by an angle of essentially 5 degrees to converge in the direction in which cutter 24' is pulled across the grinding wheel periphery. As a result, the cutting edge will interfittingly engage the grinding wheel throughout the entire width of the grinding wheel between its opposite sides. The rake anle of the cutting edge will therefore be uniform throughout its entire length.

After the first cutting edge has been ground, arbor 278 is twisted ½ turn when cutter 24' is positioned over window section 336 and before moving the cutter back to its original position between the grinding wheel 268 and bearing 312. Now the second cutting edge is ground in the manner outlined above.

Figure 15:
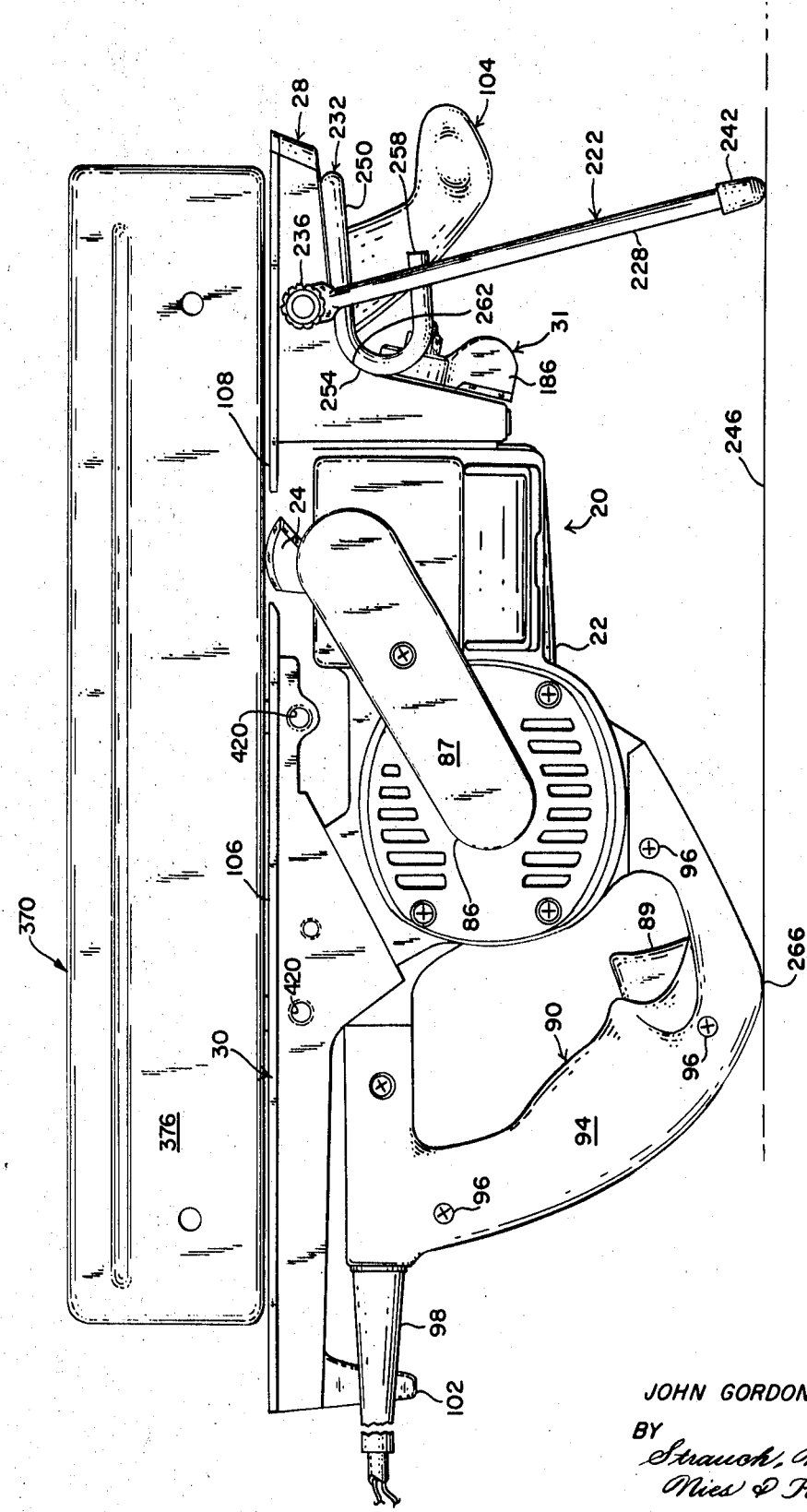
FIG. 15 is a left-hand side elevation similar to FIG. 1, but showing the blade sharpening attachment replaced with a jointer attachment.

By supporting plane 20 in its inverted position with pedestal 222, the plane may readily be converted into a jointer, using its shoes 28 and 30 as work-support tables. For this purpose a jointer fence attachment 370 is provided for and, as shown in FIGS. 15 and 16, comprises a fence and bracket assembly 372 and a fence mounting bracket 374. Assembly 372 comprises a fence 376 and a bracket 378. With the exception of pedestal 222 and screws 236 and 238, all other parts of the cutter sharpening attachment are removed when fence attachment 370 is detachably mounted on plane 20.

Bracket 374 is secured to the side of shoe 30 by a pair of screws 380 and 382 (see FIG. 16) which are threaded into blind tapped bores 384 (see FIG. 2) formed in the shoe. Bracket 378 is seated on a flat face of bracket 374 and is secured to bracket 374 by screws 386 and 388. Screws 386 and 388 are shown to extend through parallel bores 390 and 392 and are threaded into tapped holes in bracket 374. Bores 390 and 392 are formed through bosses which are integral with a horizontal ledge section 394 of bracket 378.

A third bore 396 formed through a further boss on ledge section 394 is parallel with bores 390 and 392 and is spaced from bore 392 by a distance equal to the spacing between bores 390 and 392. With this construction, screws 386 and 388 may be mounted in bores 392 and 396 instead of bores 390 and 392 to thus adjust the position of fence 376 longitudinally with respect to the plane.

As shown in FIGS. 16–18, bracket 378 is pivotally mounted on fence 376 by pins 397 (one shown) and is formed with parallel side walls 398 and 400 which are integral with ledge section 394 and which fit between parallel ears 402 and 404. Ears 402 and 404 are fixed to fence 376 and extend at right angles therefrom. Each of the side walls 398 and 400 is formed with an arcuate slot 406 (see FIG. 17) having a uniform radius and aligning with a correspondingly contoured slot 408 (see FIG. 18) formed through the associated ear. A screw 410 extending through each pair of mating slots 406 and 408 is threaded into nut 412 to releasably clamp fence 376 in place on bracket 378. By loosening nuts 412, fence 376, owing to the lengths of slots 406 and 408, may be pivoted relative to bracket 378 to selectively vary the angle between fence 376 and the work-engaging surfaces 106 and 108 of shoes 28 and 30. The pivot axis of fence 376 as provided by pins 376 extends parallel to the longitudinal axis of the plane.

As shown, fence 376 comprises a generally flat-sided plate having its top, bottom and side edges rounded to present smooth corners to the work area, thereby avoiding any inadvertent gauging of the work. When attachment 370 is mounted on plane 20, fence 376 extends upwardly from the corresponding side edges of shoes 28 and 30. A square or other suitable implement may be set against one shoe surface and fence 376 to measure the angle between fence 376 and the work-engaging shoe surfaces. This angle, as mentioned above, may be adjusted by loosening nuts 412 and pivoting the fence. When the desired angle is obtained (usually 90 degrees) nuts 412 are tightened to clamp fence 376 in its adjusted position.

To mount attachment 370 on plane 20, bracket 374 is first mounted on the plane by screws 380 and 382 and assembly 372 is then mounted on bracket 374 by screws 386 and 388. In this embodiment, fence 376 is shown to be mounted on the side of plane 20 having cap 56. Alternatively, attachment 370 may be mounted on the opposite side of plane 20 by providing tapped bores 420 (see FIG. 1) in the side of shoe 30.

When plane 20 is converted to a jointer, it is apparent that shoes 28 and 30 may be adjusted in the usual manner. Since shoe 28 becomes the front table of the jointer, it will be adjusted slightly higher than shoe 30.

The fence attachment also may be used when planing the edges of doors, screens, storm windows and other long edges.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A cutter sharpening attachment for adapting a hand-manipulated, power-operated plane having (a) a housing, (b) a cutter element rotatably supported on said housing, and (c) motor means drive connected to said cutter element to sharpen a bladed cutter, said attachment comprising pedestal means for supporting said plane in an inverted position, a grinding wheel adapted to be rotatably mounted on said housing and drive connected to said motor means in place of said cutter element, cutter support means for rotatably and reciprocably supporting a bladed cutter to be sharpened and means for detachably mounting said cutter support means on said plane in overlying relation to a work-engaging shoe surface of the inverted plane to position said bladed cutter for rotational and reciprocable blade-sharpening engagement with said grinding wheel along an axis extending substantially parallel to the rotational axis of said wheel.

2. The cutter sharpening attachment defined in claim 1 wherein said cutter support means comprises a frame and an arbor for coaxially mounting said cutter and being rotatably and reciprocably supported on said frame.

3. The cutter sharpening attachment defined in claim 2 comprising means on said frame for guidingly engaging the arbor-supported cutter to maintain a cutting edge of spiral contour in contact with said grinding wheel as said cutter is advanced across said wheel.

4. The cutter sharpening attachment defined in claim 3 wherein said means on said frame comprises an edge thereof inclined relative to the longitudinal axis of said arbor and adapted to engage the back of a spirally contoured cutting edge to rotatably guide said cutter in directions correlated with the direction of blade-sharpening axial advancement of said cutter, said edge delimiting an aperture formed in said frame and through which the cutting edges of said cutter are adapted to extend for engagement with said grinding wheel.

5. The cutter sharpening attachment defined in claim 4 wherein said aperture has a first window section disposed to one side of said grinding wheel and a second window section merging with said first window section and extending over and beyond the other side of said grinding wheel, said first window section being sufficiently wide and long to allow said cutter to be rotated through an angle of 360 degrees, said second window section being sufficiently narrow to prevent said cutter when positioned thereover from being turned sufficiently far to bring another cutting edge into engagement with said grinding wheel.

6. The cutter sharpening attachment defined in claim 2 wherein said frame is pivotally adjustable about an axis extending parallel to the longitudinal axis of said arbor for selectively raising and lowering the arbor mounted cutter relative to said grinding wheel.

7. The cutter sharpening attachment defined in claim 2 wherein the assembly of said frame and said arbor is reciprocably adjustable along a path extending normal to the rotational axis of said grinding wheel to selectively vary the lateral distance between said cutter axis and said grinding wheel axis, thereby accommodating cutters of different diameters.

8. The cutter sharpening attachment defined in claim 2 wherein said means for detachably mounting said cutter support means on said plane comprises a bracket mounting said frame and fastener means releasably securing said bracket to said plane, said pedestal means being secured to said plane by said fastener means.

9. The cutter sharpening attachment defined in claim 8 wherein the assembly of said bracket, said frame, and said arbor is pivotally adjustable on said fastener means to selectively raise and lower the cutter to be sharpened relative to said grinding wheel.

10. The cutter sharpening attachment defined in claim 3 comprising means for non-rotatably mounting said grinding wheel on a rotatable cutter support shaft of said plane.

11. The cutter sharpening attachment defined in claim 1 wherein said pedestal means cooperates with a handle of said plane to seat the plane in its inverted position on a support surface.

12. The cutter sharpening attachment defined in claim 11 wherein said pedestal means comprises a pair of legs adapted to be detachably secured to and depending from the front shoe of said plane in its inverted position, said legs being disposed symmetrically on opposite sides of the longitudinal axis of said plane and forwardly of said handle to form with said handle a tripod-like support.

13. A cutter sharpening attachment for adapting a hand-manipulated, power-operated plane having a rotatably mounted cutter-mounting shaft and motor means drive connected to said shaft to sharpen a bladed cutter, said attachment comprising a grinding wheel adapted to be mounted on said shaft in place of the cutter for said plane, means for detachably mounting a bladed cutter on said plane for blade-sharpening advancement across said grinding wheel, and means for drive connecting said grinding wheel to said shaft comprising a spacer element adapted to be non-rotatably mounted on said shaft to one side of said grinding wheel and means providing a frictional drive connection between axially opposed faces of said spacer and said grinding wheel to impart the rotational motion of said shaft to said wheel.

14. A cutter sharpening attachment for adapting a hand-manipulated, power-operated plane having a rotatably mounted cutter element and motor means for driving said cutter element to sharpen a bladed cutter, said attachment comprising a grinding wheel, means for drive connecting said wheel to said motor means in place of said cutter element, a frame, a bracket secured to said frame for detachably mounting said frame on said plane, a cutter arbor supported on said frame for rotational and reciprocable movement with respect to an axis extending parallel to the rotational axis of said grinding wheel and means for mounting a cutter on said arbor for blade sharpening advancement across said wheel.

15. The cutter sharpening attachment defined in claim 14 wherein the assembly of said arbor and said frame is mounted on said bracket for adjustment along a path extending normal to the rotational axis of said grinding wheel to selectively vary the lateral distance between the arbor axis and the grinding wheel axis for accommodating cutters of different diameters.

16. The cutter sharpening attachment defined in claim 15 comprising coacting reference indicia and marker means on said frame and said bracket for providing a direct reading of the cutter diameter for which the assembly of said arbor and said frame has been adjusted relative to said grinding wheel.

17. The cutter sharpening attachment defined in claim 16 comprising a scale on said frame for measuring the diameter of a cutter to be sharpened.

18. A cutter sharpening attachment for adapting a hand-manipulated, power-operated plane having a rotatably mounted cutter element and motor means for driving said cutter element to sharpen a bladed cutter, said attachment comprising a grinding wheel, means for drive connecting said wheel to said motor means in place of said cutter element, a frame, means for detachably mounting said frame on said plane, and an arbor for mounting a cutter to be sharpened and being supported on said frame for reciprocation along an axis extending parallel to the rotational axis of said grinding wheel for advancing a cutter across said wheel, the assembly of said frame and said arbor being swingably adjustable about an axis extending parallel to the rotational axis of said grinding wheel to vary the elevation of the arbor relative to said wheel.

19. In a cutter sharpening apparatus having a rotatably mounted motor driven grinding wheel, a frame, an arbor reciprocably mounted on said frame for supporting a cutter for blade-sharpening advancement across said grinding wheel, with said arbor extending through an open-ended bore in said cutter, the improvement comprising means consisting of a screw member coaxially fixing said cuttor on said arbor against both rotational and axial displacement, said screw member being threaded in a tapped open-ended bore radially formed through said arbor and extending only at one end into an aligning radial bore formed in said cutter.

20. A cutter sharpening attachment for adapting a hand-manipulated, power-operated plane having a motor driven shaft and a cutter element mounted on said shaft to sharpen a bladed cutter, said attachment comprising pedestal means for supporting said plane in an inverted position, a grinding wheel, means for mounting said grinding wheel on said shaft in place of said cutter element, cutter support means for rotatably and reciprocably supporting a bladed cutter to be sharpened and means for detachably mounting said cutter support means on said plane in overlying relation to a work-engaging shoe surface of the inverted plane to position said bladed cutter for rotational and reciprocable blade-sharpening engagement with said grinding wheel along an axis extending substantially parallel to the rotational axis of said wheel.

References Cited

UNITED STATES PATENTS

| 1,457,492 | 6/1923 | Bloodgood | 143—6.43 |
| 2,520,875 | 8/1950 | Birchmeier | 144—35.5X |
| 1,715,696 | 6/1929 | Eberhart | 51—92X |
| 695,931 | 3/1902 | Heywood. | |
| 847,463 | 3/1907 | Busselle | 51—247X |
| 3,365,843 | 1/1968 | Robinson | 51—225 |

FOREIGN PATENTS

| 438,215 | 11/1935 | Great Britain. |

JAMES L. JONES, Jr., Primary Examiner

UNITED STATES PATENT OFFICE
CERTIFICATE OF CORRECTION

Patent No. 3,559,350                    Dated February 2, 1971

Inventor(s)          John Gordon Bentley

It is certified that error appears in the above-identified patent and that said Letters Patent are hereby corrected as shown below:

Column 11, line 55, delete "frame is adjusted" and insert -- cutter to be sharpened --.

Column 13, line 15, "anle" should be -- angle --.

Column 16, line 40, "cuttor" should be -- cutter --.

Signed and sealed this 25th day of May 1971.

(SEAL)
Attest:

EDWARD M. FLETCHER, JR.                 WILLIAM E. SCHUYLER, JR.
Attesting Officer                       Commissioner of Patents